United States Patent [19]

Eberle et al.

[11] Patent Number: 4,630,424
[45] Date of Patent: Dec. 23, 1986

[54] TOP HUNG TRUSS

[75] Inventors: George F. Eberle, St. Louis; Karl L. Bickel, O'Fallon, both of Mo.; John M. Denny, Renton, Wash.

[73] Assignee: Lumbermate Company, St. Louis, Mo.

[21] Appl. No.: 651,041

[22] Filed: Sep. 14, 1984

[51] Int. Cl.$^4$ .......................... E04C 3/17; E04C 3/292
[52] U.S. Cl. ........................................ 52/693; 52/691; 52/DIG. 6
[58] Field of Search ................. 52/639, 642, 691, 693, 52/696, 702, DIG. 6, 690

[56] References Cited

U.S. PATENT DOCUMENTS

| 702,332 | 6/1902 | Samen | 52/691 |
|---|---|---|---|
| 3,345,792 | 10/1967 | Chandler | 52/693 X |
| 3,531,904 | 10/1970 | Sanford | 52/693 X |
| 4,001,999 | 1/1977 | Chandler | 52/693 |
| 4,031,686 | 6/1977 | Sanford | 52/693 |

OTHER PUBLICATIONS

The Design of Glued Joints for Wood Trusses and Frames, Purdue University, Dec. 1961.
Alpine Engineered Products, Inc., "Alpine Truss Catalog", pp. 4-8, ©1979.

Primary Examiner—John E. Murtagh
Assistant Examiner—Richard E. Chilcot, Jr.
Attorney, Agent, or Firm—Gravely, Lieder & Woodruff

[57] ABSTRACT

At each end of a top hung wood truss one or more end webs are attached to top chord by connector plates which not only embed in the end webs and the top chord in the region of the joint between them, but also extend outwardly beyond the joint in the form of legs that embed within the chord extension, that is the portion of the top chord which extends beyond the joint and rests on the bearing surface that supports the truss. Indeed, the outwardly projecting leg of each connector plate is located over the bearing surface, its lower margin being close to the underface of the chord extension to lessen the tendency of wood fibers in the top chord to crush in that region. The plate strengthens the top chord at its extension, enabling it to better withstand the shear forces and moments that are within the chord extension. Furthermore the axial forces which are transmitted longitudinally by the top chord and any oblique web at the end of the truss intersect well within the confines of the connector plates, so that extreme eccentricity and accompanying high moments do not develop in the plates.

11 Claims, 6 Drawing Figures

TOP HUNG TRUSS

BACKGROUND OF THE INVENTION

This invention relates in general to wood trusses and more particularly to wood trusses which are hung from their top chords.

Wood trusses find widespread use in the construction industry, primarily as a principal component of roofs and of floor systems. Irrespective of its location, the typical truss has wood top and bottom chords and usually a series of wood webs that are extended between the top and bottom chords, often oriented at oblique angles to such chords. The joints between the webs and chords are secured with truss connector plates, the typical plate being nothing more than a rectangular piece of steel having sharp projections extended from one of its faces. With a plate spanning a joint, the projections are driven into and embed within the lumber at the joint, thus firmly attaching the lumber and securing the joint.

So-called top hung trusses, that is trusses which are supported at the ends of their top chords, present a special problem, because the entire weight of the truss as well as the load that is carried by the truss is supported beyond the last webs of the truss, thus imparting significant shear forces and moments in these regions of the truss. At each end of a typical top hung truss, the top chord projects beyond the last web which intersects with it as well as beyond the connector plate which joins that web to the top chord (FIG. 1). While the load on the truss is along most of the truss distributed through the chords and webs, the load beyond the last web-chord joint in the top chord is carried entirely by the chord extension, that is by the portion of the top chord that projects beyond the endmost joint and rests on the bearing surface. This imparts shear and moment stresses to the chord extension.

The shear force and the moment tend to split the lumber perpendicular to the direction in which the shear force is applied. In this regard, wood is quite strong in the direction of its grain in tension and compression, but it is quite weak in shear. The shear forces and moment tend to cause the wood within the extension of the top chord to pull apart and split along the grain (FIG. 1).

Furthermore, the axial forces transmitted by the top chord and the last webs do not intersect near the center of the connector plate as is desirable, but instead intersect near the outside upper corner of that plate. This produces eccentricity in the joint or more accurately in the connector plate, requiring the plate to resist a large induced or secondary moment (FIG. 1).

Usually the bearing for a top hung truss is some sort of wood sill plate and when a truss is so supported, the load tends to concentrate along the inner edge of the sill plate, this to a large measure being the result of slight bending in the chord extension due to the moment caused by the offset of the load from the last connector plate. In any event, the uneven distribution of the load tends to crush the top chord extension in the region of the inner edge of the sill and if the sill is wood, it is likewise crushed along its inner edge. As a consequence, a certain amount of rotation occurs along the inner edge of the sill plate, and this rotation imparts a deflection to the truss itself.

Close tolerances are difficult to hold on large construction projects, and the typical ½ inch tolerance that is left as a working clearance beyond the endmost web can vary. The greater the clearance, the more pronounced the foregoing problems become.

SUMMARY OF THE INVENTION

One of the principal objects of the present invention is to provide an improved top hung wood truss that is capable of supporting large loads, substantially heavier than loads of corresponding conventional trusses. Another object is to provide a truss of the type stated in which the forces taken by the top chord and the last web or webs intersect at a point that is well within the confines of the connector plates which join that chord and web or webs. A further object is to provide a truss of the type stated which distributes the load carried by the truss generally uniformly across the bearing surfaces for the truss. An additional object is to provide a truss of the type stated which is very rigid. Still another object is to provide a truss of the type stated which is substantially stronger in the end portions or top chord extensions, that is in the portions of the top chord that project beyond the last web. Yet another object is to provide a truss of the type stated in which the wood in the top chord extensions is less likely to crush or split than the wood in the top chord extensions of conventional trusses. Still another object is to provide a truss connector plate for joining the endmost web or webs of a top hung truss with the top chord such as to impart the foregoing characteristics to the truss. These and other objects and advantages will become apparent hereinafter.

DESCRIPTION OF THE DRAWINGS

In the accompanying drawings which form part of the specification and wherein like numerals and letters refer to like parts wherever they occur—

DETAILED DESCRIPTION

Figure 1:
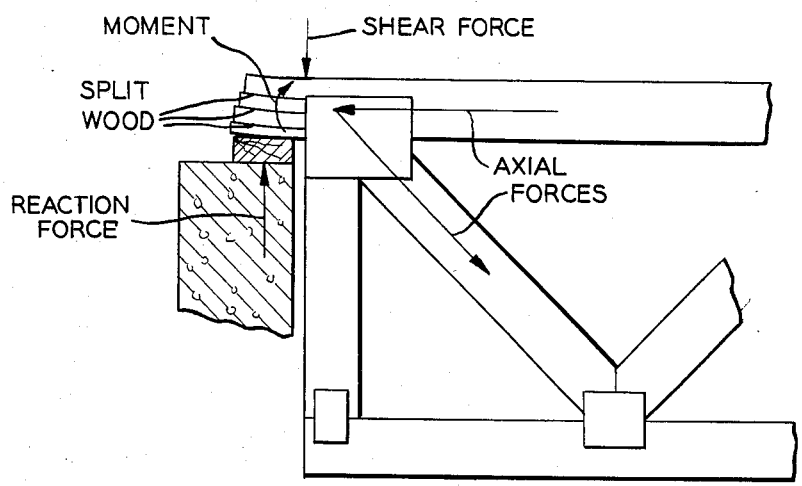
FIG. 1 is a partial side elevational view of a conventional top hung truss held together adjacent its top chord extension with a conventional rectangular connector plate, the wood of the top chord extension being illustrated split along the grain as it will, if the truss fails.
Figure 2:
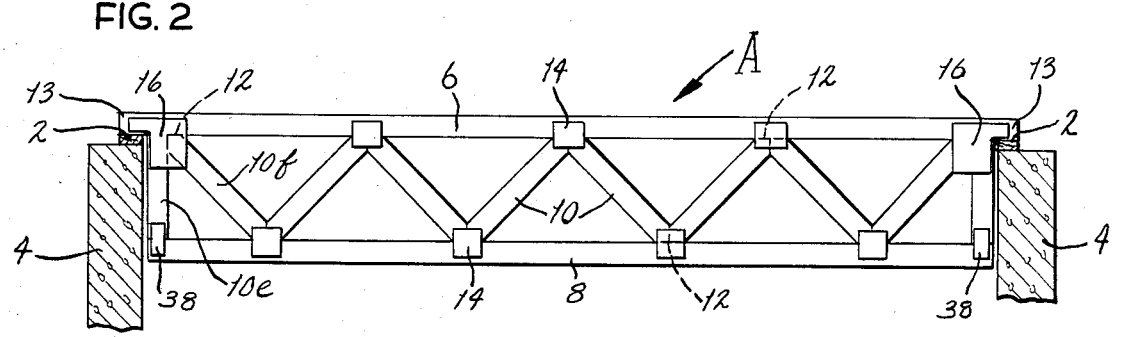
FIG. 2 is a side elevational view of a top hung truss provided with connector plates constructed in accordance with and embodying the present invention.

Referring now to the drawings (FIG. 2), a truss A is supported at each end on bearing surfaces 2 which may be the upper surfaces conventional 2×4 lumber or larger lumber positioned on top of some type of wall 4 to form sill plates. The truss A possesses the top hung configuration, which means that at least some of its load carrying members are below the bearing surfaces 2. Its load carrying members are all wood, and these members are joined together by truss connector plates which for the most part are conventional.

More specifically, the truss A includes (FIG. 2) a top chord 6 which spans the space between the two bearing surfaces 2, resting at its ends on those bearing surfaces.

The truss A also has a bottom chord 8 which may be parallel to the top chord 6, but is slightly shorter than the top chord 6. As its name implies, the bottom chord 8 is below the top chord 6 and as a consequence is somewhat shorter in length than the space between the opposite walls 4 so that it does not interfere with those walls. Both the top chord 6 and the bottom chord 8 may be a single piece of lumber or they may constitute several pieces of lumber set end to end, or side by side, or both. Normally, the lumber from which the chords 6 and 8 are derived is rectangular in cross section, such as typical 2×4, 2×6 or 2×8 lumber, and when so configured, it is common to orient the lumber on edge, that is with its major cross-sectional axis vertical. However, it is not uncommon to orient the lumber of the chords 6 and 8 with the major cross-sectional axes of that lumber extended transversely, in which case each chord may comprise two or more pieces of lumber stacked face to face.

Figure 3:
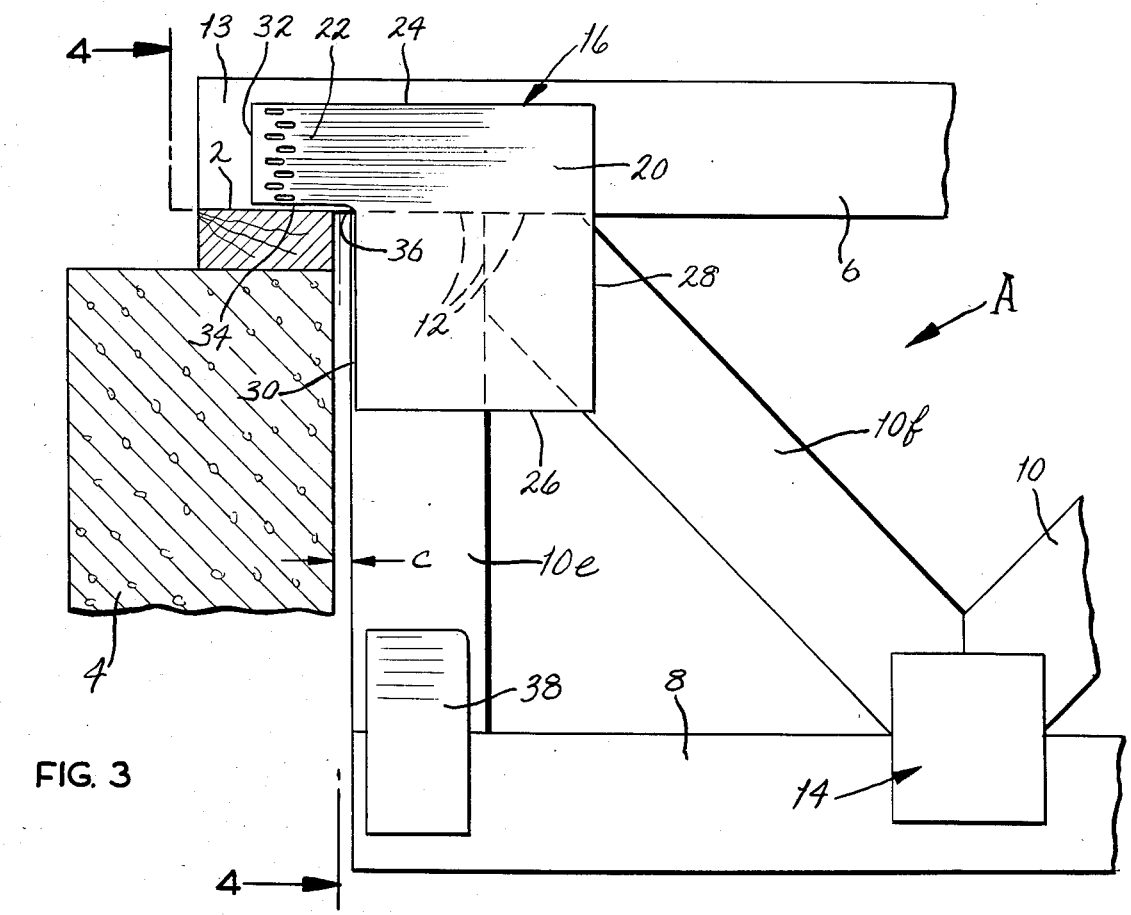
FIG. 3 is an enlarged partial side elevational view of one end of the truss illustrated in FIG. 2.

In addition to the top and bottom chords 6 and 8, the truss has a series of webs 10 which extend between the top chord 6 and the bottom chord 8, abutting the lower surface of the former and the upper edge of the latter at butt joints 12. In this regard, the lumber from which the chords 6 and 8 are formed is rectangular in cross-section and is oriented in the truss A such that its flat surfaces are presented horizontally and vertically. The narrower of these flat surfaces normally faces upwardly and downwardly and the wider normally faces laterally, at least when the lumber of the chords 6 and 8 is oriented on edge, although when the opposite orientation is used for the chords 6 and 8, a corresponding orientation is normally used for the webs 10. The webs 10, when so oriented, may be single or plural. Some or all of the webs 10 are oblique to the parallel top and bottom chords 6 and 8, but they are fitted between the lower surface of the top chord 6 and the upper surface of the bottom chord 8 with their side faces flush with the side faces of the top and bottom chords 6 and 8. Moreover, their ends are mitered so that the joints 12 are truly butt joints (FIG. 3). The arrangement or pattern that the webs 10 produce is not particularly important and may vary. For example, they may form a Howe pattern, or a Warren or W pattern, or a fan pattern. Irrespective of the pattern, at each end of the truss A at least one web 10 intersects, that is abuts, the underside of the top chord 6 somewhat inwardly from the end of the chord 6 to provide a chord extension 13 that extends beyond the last or endmost web 10. It is at the chord extensions 13 that the truss A rests on and is supported by the bearing surfaces 2. Actually the endmost webs 10 are set slightly inwardly from the bearing surfaces 2 so that a clearance c on the order of one-half inch exists as a construction tolerance between the inside edges of the bearing surfaces 2 and the endmost webs 10. Construction practices being what they are, this clearance can vary considerably.

The truss A possesses a typical configuration, and at each end it has a vertical web 10e that extends between the top and bottom chords 6 and 8 perpendicular to each, and an oblique web 10f that extends diagonally away from the joint 12 between the top chord 6 and the vertical web 10e to a joint on the bottom chord 8 that is offset from the end of that chord. The upper end of the oblique web 10f is mitered to fit into the corner formed at the joint 12 between the vertical web 10e and the top chord 6, while the lower end is mitered to provide a butt joint 12 with the bottom chord 8. Both the vertical web 10e and the adjacent oblique web 10f, being each at the end of the truss A, may be considered end webs.

With the exception of the butt joints 12 formed by the intersection of the top chord 6, the vertical end webs 10e and the adjacent oblique end webs 10f, all of the webs 10 are connected to the top and bottom chords 6 and 8 with conventional truss connector plates 14 that are rectangular in configuration. These devices are stamped from galvanized steel sheet of 14 to 20 gauge and have sharp projections which are blanked from the sheet and turned at 90° so as to protrude from one face of the sheet. The conventional truss plates 14 are laid over the side faces of the webs 10 and chords 6 and 8 at the joints 12 between them with the sharp projections being against the wood, and are then forced toward the wood so that the projections embed in the wood. Thus the connector plates 14 span the joints 12, making those joints 12 quite rigid and secure.

At each end of top chord 6, extended connector plates 16 (FIGS. 2, 3 & 5) span and secure the joint 12 at which the top chord 6, the vertical end web 10e, and the adjacent oblique end web 10f intersect.

Like the conventional connector plates 14, each extended plate 16 is formed from galvanized sheet steel having sharp projections 18 (FIG. 5) blanked from it and bent outwardly away one face of the plate 16. However, the plate 16, instead of being perfectly rectangular, is L-shaped. More particularly, the plate 16 has a main connecting section 20 and a relatively short leg 22 projecting from one side of the main section 20, the section 20 and leg 22 being formed integral with each other and having the sharp projections 18 throughout. The main section 20 is essentially rectangular, it having (FIGS. 3 & 5) a top margin 24 and a parallel bottom margin 26, as well as a long side margin 28 that extends the full height of the plate 16 and a short side margin 30 that extends upwardly from the bottom margin 26 to the leg 22. The leg 22 projects outwardly from the main section 20 above the short side margin 30, it also having a side margin 32 that is parallel to the main section side margins 28 and 30, but is displaced outwardly from them. The top margin 24 of the main section 20 continues over into the leg 22 so that the main section 20 and leg 22 share the top margin 24. Completing the leg 22 is a bottom margin 34 which extends between the leg side margin 32 and the main section side margin 32, it being parallel to the top and bottom margins 24 and 26 and located between them. The side margins 28, 30 and 32 intersect the top and bottom margins 24, 26 and 34 at right angle corners. While the shape of the outside corners is not too critcal, the inside corner formed by the convergence of the short side margin 30 of the main section 20 and the bottom margin 34 of the leg 22 is arcuate, that is the two margins 32 and 34 merge at a short curved edge 36 having a radius of not less than 1/16 inch.

The width of the main section 20, that is the distance between its side margins 30 and 32 is great enough to enable the main section 20 to extend across substantially the full width of the vertical end web 10e as well as the full width of the oblique end web 10f at the butt joint 12 between the top chord 6 and the webs 10e and 10f. The height of the leg 22, that is the length of its side margin 32, is not less than about 50% the height of the top chord 6, but the leg 22 can extend the full height of the top chord 6. The extent of the projection for the leg 22, that is the length of its bottom margin 34 should exceed the standard clearance c by about at least 1½ inches so that it overlaps the bearing surface 2 by at least that amount.

The extended connector plate 16 is placed over the side faces of the top chord 6 and the end webs 10e and 10f at the butt joint 12 between them, with the projections 18 protruding toward those side faces. When properly positioned, the top margin 24 of the plate 16 is parallel to the top surface of the top chord 6, while the bottom margin 34 of the leg 22 is at or perhaps 1/16 inch above the bottom margin of the extended end portion on the top chord 6. The short side margin 30 for the main section 20 is at or may be offset away from the outer end face of the vertical web 10e, which is the face that is presented toward the wall 4. Once the extended plate 16 is properly positioned, it is driven into the top chord 6 and webs 10e and 10f using conventional truss fabricating machinery. This causes the projections 18 to embed within the top chord 6 and within the two webs 10e and 10f and thereby locks all three together to rigidify the joint 12 at which they intersect.

If the plate 16 is properly positioned when it is driven into the chord 6 and webs 10e and 10f, the bottom margin 34 of the leg will lie along and be parallel to the bottom surface of the top chord extension 13, or will be set slightly higher, perhaps no more than $\frac{1}{8}$ inch. The short side margin 30 is at and parallel to the outside surface of the vertical web 10e or may be offset slightly to expose a very thin area of the side face for the web 10e. The curved margin 36 lies at the butt joint 12 between the vertical web 10e and the top chord 6. The top margin 24 lies a short distance beneath, yet parallel to the top surface of the top chord 6.

Figure 4:
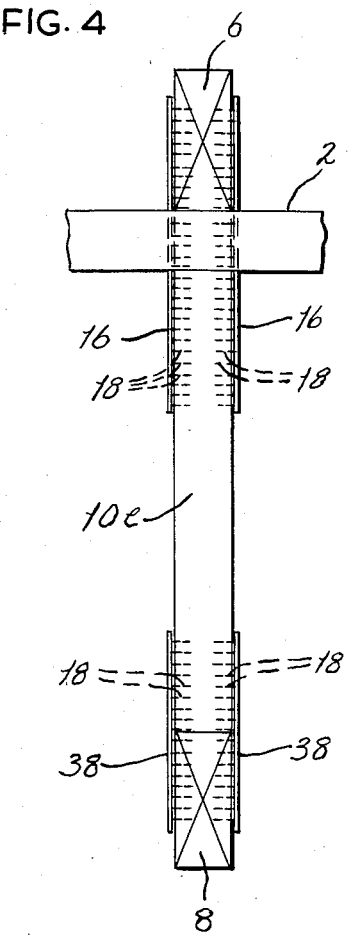
FIG. 4 is an end view of the truss taken along line 4—4 of FIG. 3.

Of course another extended connector plate 16 is applied to the opposite side faces of the top chord 6 and webs 10e and 10f at the joint 12 in the manner previously described (FIG. 4), and this plate 16 is merely the reverse or a mirror image of the plate 16 previously described. In other words, its projections 18 protrude in the opposite direction.

Since the legs 22 of the extended connector plates 16 project out into the extension 13 of the top chord 6 and indeed are presented directly above the bearing surface 2, shear stresses as well as moments in the top chord 6 at its intersection with the webs 10e and 10f are shared by the connector plates 16 and the wood of the top chord 6. Thus, the wood of the top chord 6 does not tend to split in the direction of the grain at the chord extension 13. Moreover, the lower margins 34 of the legs 22 for the two extended connector plates 16 overlie the inner margin of the bearing surface 2, which is the region where the load tends to concentrate in a conventional top hung truss. Actually, the lower margins 34 of the legs 22 present rigid surfaces which remain parallel to the bearing surface 2, so the tendency for the chord to crush at the inner margin of the bearing surface and to rotate about that inner margin is reduced substantially. This decreases deflection of the truss A under load, or in other words, rigidifies the truss A. Moreover, the point at which the axial forces transmitted by the top chord 6 and the web 10f intersect is well within the confines of the extended connector plate 16, and is not near any of its margins, so that no extreme eccentricity exists. Indeed, whatever eccentricity that does exist within the connector plate 16 is well within acceptable limits, and does not produce excessive stresses in the plates 16. Finally, the clearance c is not too critical and may be larger than $\frac{1}{2}$ inch without significantly jeopardizing the load carrying capacity of the truss A, and this of course derives from the increased strength imparted to the chord extensions 13 by the extended plates 16.

Figure 5:
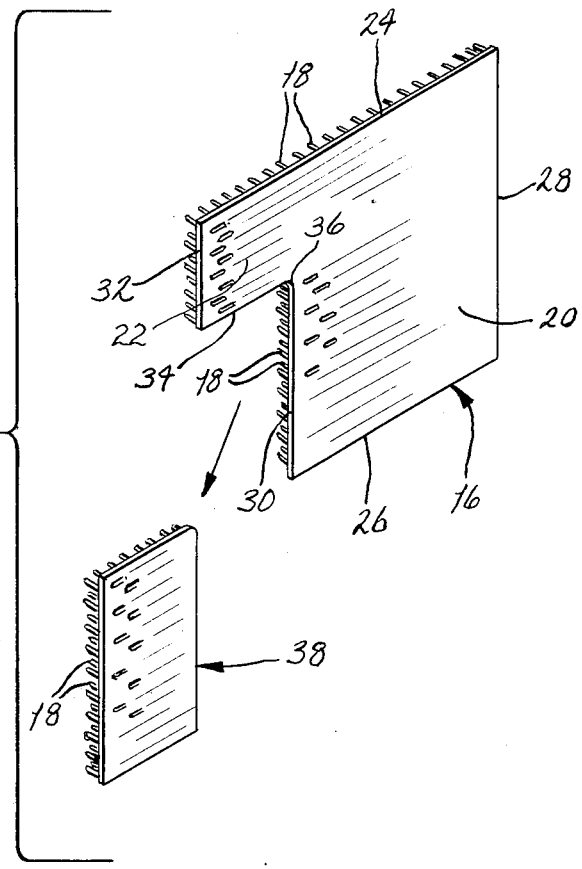
FIG. 5 is a perspective view of the improved connector plate showing the off fall separated from it.

The extended connector plate 16 may be derived from a conventional rectangular connector plate by blanking a small rectangular section from one side of the rectangular plate (FIG. 5). The lines along which the rectangular plate is sheared form the short side margin 30 in the main section 18 and the bottom margin 34 and curved margin 36 on the leg 22, and these lines should be between rows of projections 18 on the original connector plate so that the short side margin 30, the bottom margin 34 and the curved margin 36 are continuous. The portion removed from the original rectangular connector plate is called the off fall, and it forms a relatively small connector plate 38 which may be used at low stress joints 12, such as the joint 12 between endmost vertical web 10e and the bottom chord 8.

Another typical truss B (FIG. 6) at each of its ends has only an oblique web 10g which extends downwardly from the top chord 6 to the bottom chord 8, preferably at about 45°, and at its ends are mitered to form butt joints 12 with the bottom surface of the top chord 6 and the upper surface of the bottom chord 8. The upper end of the endmost oblique web 10g is set inwardly from the end of the top chord 6 and the portion of the top chord 6 which projects beyond the oblique web 10g constitutes the chord extension 13 which rests on the bearing surface 2. Again a clearance c exists bewteen the inner edge of the bearing surface 2 and the outermost margin of the web 10g.

Figure 6:
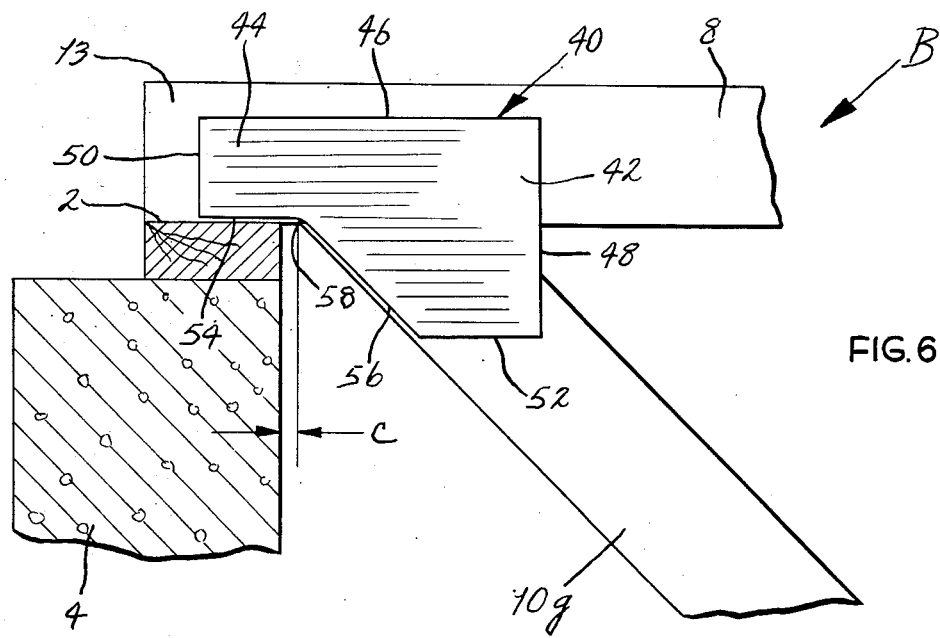
FIG. 6 is a partial side elevational view of a modified truss and connector plate.

The joint 12 between the top chord 6 and the upper end of the endmost oblique web 10g is secured by an extended connector plate 40 (FIG. 6). Like the extended plate 16, the plate 40 has a main section 42 and a leg 44 projected from the main section 42, but the main section 42 is trapezoidal in configuration rather than rectangular. The plate 40 has a top margin 46 which is common to its main section 42 and leg 44, a full side margin 48 along its main section 42, another side margin 50 along its leg 44, a bottom margin 52 along its main section 42 and still another bottom margin 54 along its leg 44. In addition the plate 40 has an oblique margin 56 which is along its main section 42, extending between the bottom margin 54 of the leg 44 and the bottom margin 52 of the main section 42. The inclination of the oblique margin 56 is the same as that for the web 10g. Finally, the bottom margin 54 of the leg and the oblique margin 56 of the main section 42 merge at a curved margin 58.

When the connector plate 40 is properly emplaced over the butt joint 12 between the top chord 6 and the oblique web 10g with its projections driven into and embedded within the chord 6 and web 10g, the bottom margin 54 of the leg 44 lies along or close to the bottom surface of the top chord extension 13, while the oblique margin 56 lies along or close to the outwardly presented surface of the oblique web 10g, that is along the surface which is generally presented toward the wall 4. The top margin 46, on the other hand, lies beneath the upper surface of the chord 6 and the full side margin 48 is beyond the innermost end of the butt joint 12 between the top chord 6 and the web 10g. The leg 44 projects out over the bearing surface 2, covering at least 1½ inches of the width of that surface.

The connector plates 40 impart the same advantages to the truss B as the plates 16 impart to the truss A. They take much of the shear stress in the critical region of the truss extension 13 immediately beyond the joint 12 and further resist moments within this region as well. They also prevent loads from concentrating along the inner edge of the bearing surface 2, and this rigidifies the truss by reducing rotation with its accompanying deflection. Also the axial forces transmitted by the top chord 6 and web 10g intersect well within the confines of the plate 40 so the plates 40 are not eccentrically loaded in any excessive amount. The increase strength of the chord extensions 13 enables larger clearances c to be employed.

While the top and bottom chords 6 amd 8 in the trusses A and B are parallel and horizontal, they need not be. Indeed either or both may be sloped. For example, the top chords may be inclined as in a top hung roof truss.

This invention is intended to cover all changes and modifications of the example of the invention herein chosen for purposes of the disclosure which do not constitute departures from the spirit and scope of the invention.

What is claimed is:

1. A truss comprising: a wood top chord having an upper surface; a wood bottom chord located below the top chord; wood webs extended between the top and bottom chords with at least some of the webs being oblique to the top and bottom chords so that the chords and webs transmit axial forces in the truss when a downwardly directed load is applied to the truss, the endmost of the webs being offset from the end of the top chord such that a portion of the top chord extends beyond the endmost web in the form of a chord extension at which an upwardly directed supporting force is exerted on the truss to resist the downwardly directed load, the endmost of the oblique webs being oriented such that the axial force transmitted by it intersects the axial force transmitted by the top chord below the upper surface of the top chord and near the inner end of the chord extension, so that the upwardly directed supporting force on the cord extension is offset from the location where the axial forces intersect, whereby shear forces exist at the chord extension and a bending moment develops generally about the inner end of the chord extension; and a metal connector plate joining the top chord and the endmost oblique web together and having an upper margin that is located below the upper surface of the top chord so that a portion of the top chord is exposed above the connector plate, the plate including a main section and a leg extended from the main section, the main section overlying the side faces of the top chord and the endmost oblique web and containing projections which are embedded in the top chord and endmost oblique web, the leg being formed integral with the main section and projecting from the main section such that the leg and main section form an inside corner in the connector plate, the leg overlying the chord extension and containing projections which are embedded in the chord extension, whereby shear forces and bending moments at the chord extension will be transmitted at least in part through the connector plate, the plate being configured and positioned such that the location at which the axial forces transmitted in the top chord and endmost oblique chord intersect is within the confines of the plate.

2. A truss according to claim 1 wherein the leg has a bottom margin which is positioned parallel and close to the lower surface of the top chord extension.

3. A truss according to claim 1 wherein the connector plate is L-shaped, with the upper margin of the leg and the upper margin of the main section being colinear.

4. A truss according to claim 1 wherein the main section of the connector plate has a short side margin which lies along the surface of the endmost web that is presented outwardly toward the end of the truss, and the short side margin of the main section and the bottom margin of the leg merge at a curved margin.

5. A truss according to claim 1 wherein the endmost web is generally perpendicular to the top chord, and the endmost oblique web is located at an oblique angle with respect to the top chord and joins the top chord adjacent to the vertical endmost web; and wherein the connector plate extends over the endmost web and the endmost oblique webs and has its projections embedded in those webs.

6. A truss according to claim 1 wherein the top and bottom chords are parallel.

7. A truss according to claim 1 wherein the connector plate is blanked from a conventional rectangular connector plate to provide the leg and the main section, whereby a portion of the original plate is left over, and wherein the left over portion of the original plate is used to secure a web to one of the chords in the truss.

8. In a building having a bearing surface located along a space, an improved truss that spans the space to carry a downwardly directed load and is supported on the bearing surface where an upwardly directed supporting force is exerted on the truss to resist the load, said truss comprising: a wood top chord resting on the bearing surface and extending over the space, top chord having an upper surface; a wood bottom chord located below the top chord and likewise being over the space; and wood webs extending between and being connected to the top and bottom chords, with at least some of the webs being oblique to the top and bottom chords, so that the chords and webs transmit axial forces created by the load, the endmost of the webs being offset from the end of the top chord such that a portion of the top chord extends beyond the endmost web in the form of a chord extension that rests on the bearing surface where the supporting force is applied, the endmost of the oblique webs being oriented such that the axial force transmitted by it intersects the axial force transmitted by the top chord below the upper surface of the top chord and near the inner end of the chord extension, so that the upwardly directed supporting force on the chord extension is offset from the location where the axial forces intersect, whereby shear forces exist at the chord extension and a bending moment develops generally about the inner end of the chord extension; and a metal connector plate joining the top chord and the endmost oblique web together and having an upper margin that is located below the upper surface of the top chord so that a portion of the top chord is exposed above the connector plate, the plate including a main section and a leg extended from the main section, the main section overlying the side faces of the top chord and the endmost oblique web and containing projections which are embedded in the top chord and endmost oblique web, the leg being formed integral with the main section and projecting from the main section such that the leg and main section form an inside corner in the connector plate, the leg overlying the chord extension and containing projections which are embedded in the chord extension, whereby shear forces and bending moments at the chord extension will be transmitted at least in part through the connector plate, the inside corner in the connector plate being curved, the plate being configured and positioned such that the location at which the axial forces transmitted in the top chord and endmost oblique chord intersect is within the confines of the plate.

9. The combination according to claim 8 wherein the connector plate in the region of the top chord that is over the bearing surface has a lower margin which lies close and parallel to the bottom surface of the top chord where the top chord rests on the bearing surface.

10. The combination according to claim 9 wherein the connector plate occupies at least 50% of the height of the top chord.

11. The combination according to claim 9 wherein the endmost web is perpendicular to the top chord; wherein the endmost oblique web extends oblique to the top chord and intersects the top chord at the perpendicular end web; and wherein the connector plate extends over and has its projections embedded in the endmost web and the endmost oblique web as well.

* * * * *